Patented May 19, 1936

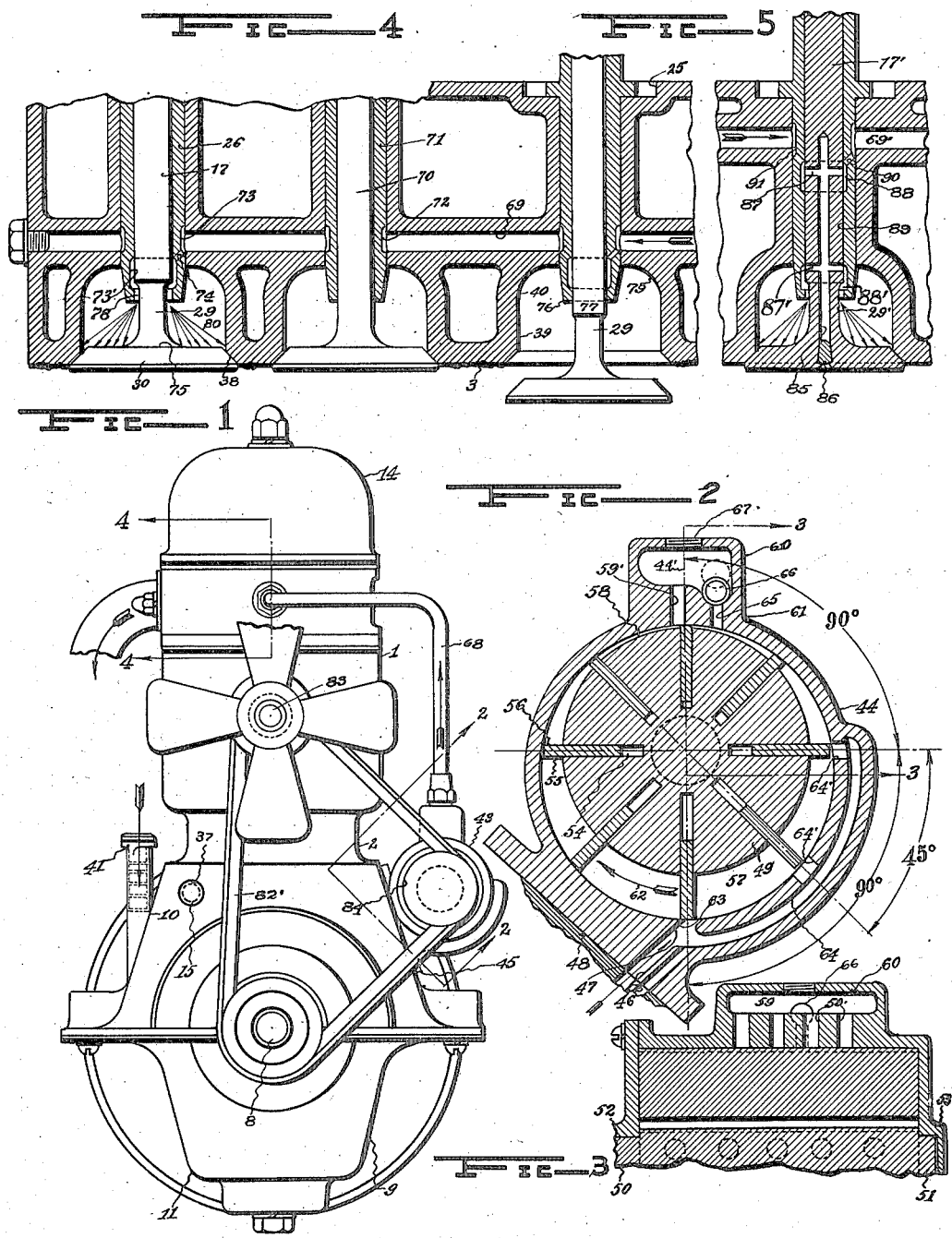

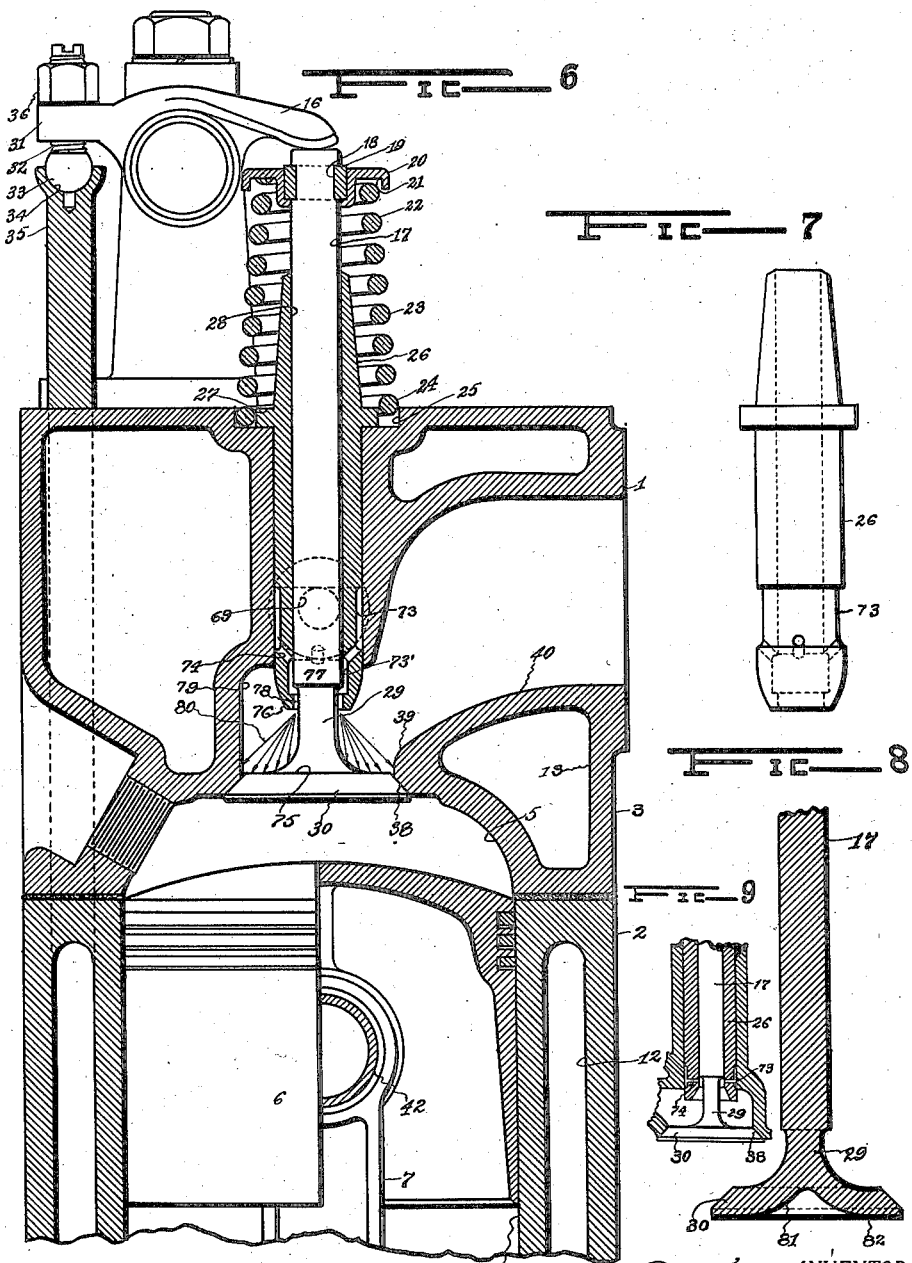

2,041,160

UNITED STATES PATENT OFFICE 2,041,160

INTERNAL COMBUSTION ENGINE VALVE

Victor F. Zahodiakin, Cincinnati, Ohio

Application December 31, 1931, Serial No. 584,068

3 Claims. (Cl. 123—177)

The invention relates to internal combustion engine valves, and is companion to the invention described in my application Serial Number 575,259, now Patent Number 1,876,160.

It is well known that the efficiency of internal combustion engines, which have poppet valves, is considerably reduced by the excessive heat of the exploded gases within the cylinders. This heat is transmitted to the exhaust valve heads and their stems and seats, because all of the hot gases developed from the exploded fuel pass through the exhaust valves, which are located in the cylinder head and have no ventilating means.

For these reasons, the valve heads and their seats soon become pitted. Moreover, the excessive heat results or assists in rapid collection and accumulation of carbon on the valve heads and stems, whereby the normal power capable of being developed by the engine is importantly reduced. Another disadvantage of the usual type of internal combustion engine is the small area of the valve which not only results in the power of the engine being decreased, but the engine is caused to vibrate considerably.

Therefore, the general object of the invention is to provide means whereby the exhaust valve head, exhaust valve seat and exhaust valve stem are maintained at a low temperature.

Other objects of the invention are to provide means whereby the walls and tops of said pistons, the cylinder walls and other operating parts of said engine, and the oil in the crank case of said engine are maintained at low temperatures; to provide means adapted to automatically lubricate the exhaust valve stems; to provide means whereby the construction of internal combustion engines employing poppet valves are improved so as to effect great simplicity, durability and high efficiency of the engine; to provide means adapted to render said engine positive of action, relatively silent while operating, durable and effective for the purpose of creating maximum power; and to provide means adapted to render said engine to operate dependably and unlikely to require frequent replacements or repairs of the exhaust valves.

Still other objects are made apparent by reference to the drawings, and the hereinafter description.

The invention resides in the combination, arrangement of the parts and in the details of the construction, as will be more fully hereinafter described and claimed.

In the drawings:

Fig. 1 is an end elevational view of an internal combustion engine having the invention incorporated therein;

Fig. 2 is a section taken on a line corresponding to 2—2 in Fig. 1;

Fig. 3 is a section taken on a line corresponding to 3—3 in Fig. 2, and with parts broken away;

Fig. 4 is a section taken on a line corresponding to 4—4 in Fig. 1, and with parts broken away;

Fig. 5 is a section taken on a line corresponding to 4—4 in Fig. 1, showing a modification of the invention;

Fig. 6 is a transverse vertical section of the engine shown in Fig. 1, with parts broken away;

Fig. 7 is a side elevational view of a valve guide, showing parts in dotted lines;

Fig. 8 is a vertical section of an exhaust valve stem and head, with parts broken away; and Fig. 9 is a modified form of the invention showing a conical depression in the valve guide.

The preferred construction of the invention is exemplified in connection with the internal combustion engine 1 comprising the usual engine block 2 having the engine head 3 suitably fixed thereto. The block 2 is provided with the usual cylinder or cylindrical bore 4, in alignment with the cylindrical bore 5 in the head, into which is slidably fitted the usual reciprocating piston 6 having connected thereto the usual connecting rod 7 which has its lower end mounted in the bearings of the crank shaft 8 rotatably mounted in usual main bearings of the crank case 9.

The crank case, comprising the usual upper casing 10 and the lower casing 11, suitably secured to each other, is suitably secured to the engine block 2 having the usual water jacket 12. The engine head has the usual water jackets 13.

Fixed to the top of the engine head is the cover 14 having its lower edge making an air-tight connection with the head.

Incorporation with the engine 1 is the usual rotatable cam shaft 15 operating the usual exhaust rocker arm 16. The arm 16 is adapted to intermittently contact the top of the exhaust valve stem 17 which has the groove 18 therein for receiving the collar 19 to which is fixed the spring retainer 20.

Received in the cup portion 21 of the spring retainer 20 is the upper end 22 of the coil spring 23 which has its lower end 24 received in the depression 25, in the top of the engine head 3. The coil spring 23 surrounds the upper end of the valve guide 26 which has integrally formed therewith the outwardly extending flange 27 received in the depression 25. The valve stem 17 is slidably mounted in the vertical hole 28 of the valve guide 26, and has integrally formed with its lower end 29 the exhaust valve head 30. The diameter of the valve stem is reduced a relatively short distance extending upwardly from the valve head 30, for purposes fully hereinafter explained.

The cam, or rocker arm, 16 has a rearwardly protruding end 31 having received therethrough the bolt 32 having integrally formed with its lower end the ball 33 which is received in the socket 34 of the vertical push-rod 35. The nut 36, threaded to the upper end of the bolt 32, is normally in engagement with the upper side of the arm. The cam shaft 15 is rotatably mounted upon the bearings 37 in the upper crank case 10.

The coil spring 23 is adapted to urge the valve stem 17 upwardly whereby, during the intake, compression and explosion strokes of the piston 6, the exhaust valve head 30 is maintained in close contact with its seat 38 formed in the walls of the exhaust port 39 which leads upwardly from the cylinder 4 and the bore 5 and communicates with the exhaust passage 40 which leads to the outside of the head 3, and passes through its outer walls.

In operation the cam or rocker arm 16 is, as usual, rotated by means of the push-rod 35 and the cam shaft 15 whose operation is previously explained, whereby the arm 16 is adapted to contact the top of the stem 17 during the exhaust stroke of the piston 6, for the purpose of opening the port 39 to permit escape of gases from the cylinder through the port and into the exhaust passage 40 to permit the exhaust gases to escape from the engine. During the intake, compression and explosion strokes of the piston 6 the arm 16 is inoperative, whereby the coil spring 23 is adapted to urge the valve stem 17 upwardly and maintain the valve head 30 in contact with its seat 38, as shown in Fig. 6.

For the purpose of providing means whereby air may be caused to circulate through the breather 41 of the crank case 9, through the cylinder 4, and around the piston wrist pin 42, to which is connected the rod 7, and particularly around the valve stem 17, and in direct contact with the valve head 30, as hereinafter explained, the air pump 43 is provided.

The air pump 43 comprises the cylindrical casing 44 having the base 45 suitably secured to the side of the upper casing 10 which has the aperture 46 therein in alignment with and communicating with the passage 47 which leads through the base 48 into the casing of the air pump.

The air pump has mounted horizontally therein the rotor 49 having its ends 50 and 51 rotatably mounted in suitable bearings in the ends 52 and 53 of the casing. The rotor 49 having therein equi-distant spaced apart radial slots 54 which extend outwardly from the center of the shaft. Slidably fixed in the slots 54 are the plates 55 adapted, when the rotor is rotated, to move outwardly, due to centrifugal force, whereby their outer edges 56 are caused to contact the inner surface of the cylindrical walls of the casing 44. The rotor 49 is mounted eccentric of the cylindrical casing whereby a space 57 is formed between the rotor and the casing. The side 58 of the rotor is adjacent or in close relation with the inner surface of the walls of the casing at a point directly above the inlet passage 47 which leads into and communicates with the compartment 59 of the casing.

In the top of the casing 44, of the air pump 43, are the spaced apart holes 59' communicating with the compartment 59 formed by the sub-casing 60 integrally formed with the top of the casing 44, at the point 61.

As indicated by the directional arrow 62, the rotor 49 rotates in a clockwise direction, whereby the plates 55 are adapted to create currents of air through the breather 41, crank case 9, hole 46, in the upper casing 10, hole 47, through the base 48 of the air pump, and into the compartment 60 of the sub-casing 61 by way of the casing 44 and the passages 59.

For the purpose of providing an efficient air pump, the passages 59 are positioned 180° from the entrance 63 of the hole, or inlet opening, 47. The outlets 59' are positioned with respect to the vertical axis 64', toward the direction in which said rotor rotates, and the inlet 47 is positioned, with respect to said axis, with the direction in which said rotor rotates and said passage 64 communicates with the inlet opening 47 and extends upwardly in a direction opposite to the direction in which the rotor rotates. The inlet 47 and the holes 64' are spaced 45° and communicate the sub-passage 64 with the inner cylindrical compartment of the casing 44 whereby the vacuum, adapted to be formed between the rotor and the inner walls of said casing is relieved.

Adjacent the holes 59', is the hole 65 which communicates with the compartment 59 in the sub-casing 60, and the inner compartment of the casing 44. A hollow ball 66 is adapted to close the upper end of the hole 65 until the compartment 59 contains sufficient oil to cause the ball 66 to float upwardly from its seating position whereby the oil which is adapted to collect within the compartment 59 is permitted to drain through the hole 65 into the compartment of the casing 44 and through the outlet and the hole 46 into the crank case. The outer edges 56 of the plates 55 are adapted to be efficiently lubricated by means of the oil which is adapted to drain through the hole 65 into the casing.

Received in the hole 67, in the upper end of the sub-casing 60, is the lower end of the pipe 68 which has its upper end received in the hole 69 having horizontal walls which extend longitudinally of the head 3 and in alignment with the intake valve stem 70 and guide 71 the exhaust valve stem 17 and guide 26. The intake valve guide 71 has circumferential grooves 72 in alignment with the hole 69 whereby air which is forced by the rotor 49 through the pipe 68 and into the hole 69, in the head 3, is adapted to pass around the intake valve stem guide 71 and in the circumferential grooves 73 in the outer surface of the exhaust valve stem guide 26.

Below the groove 73, in the exhaust valve stem guide 26, is an enlargement of the vertical hole 28, through the valve stem guide. The passage 74, in the valve stem guide, communicates between the circumferential groove 73 and the chamber or enlargement 73'. The lower end 29 of the exhaust valve stem 17 is reduced whereby the currents of air are permitted to pass through the passage 74, enlargement 73', and from the hole 28 in direct contact with the upper surface 75 of the exhaust valve head 30, when the valve head 30 is in contact with its seat 38.

As previously mentioned, the exhaust valve head 30 is in contact with its seat 38 during the intake, compression and explosion strokes of the piston 6. During the exhaust stroke of the piston 6 the exhaust valve head 30 is removed from contact with its seat 38, as by the upper end of the valve stem 17 being contacted by the rocker arm 16 which forces the stem downwardly, whereby the reduced portion 29 of the valve stem 17 is caused to move downwardly toward lower end 76 of the valve stem guide 26 whereby the portion 77, of the valve stem 17, directly above the reduced portion 29 of the valve stem, is adapted to close the base 78, formed between the reduced portion 29, of the stem 17, and the lower end 76 of the valve stem guide 26. Therefore, since the portion 77 of the stem 17 closes the opening which leads from the enlarged portion 73', of the vertical hole 28, to the port 39 and the compartment 79, currents of air normally caused by rotation of the rotor 49 are not permitted to escape from the horizontal hole 69, in the engine head 3. As a result of the currents of air, in contact with the upper surface 75, of the valve head 30, being stopped, the exploded gases within the cylinder 4 and the bore 5, respectively, of the block 2 and the head 3, are permitted to pass through the port 39 and into the exhaust passage 40 without interference.

A conical depression 81 (see Figure 8) is provided in the bottom 82 of the valve head 30 in order to reduce as much as possible the mass of the valve head. By this reduction of mass, the valve head will cool more readily.

Suitable means may be provided for imparting rotary movement to the rotor 49. The means utilized, as being the preferred construction, is illustrated in Fig. 1 and is shown as a belt 82' having connection with the fan shaft 83, the crank shaft 8, and the pulley 84 integrally connected with the end 50 of the rotor 49.

A modification of the invention is shown in Fig. 5 and consists of a simplified form of the exhaust valve stem 17' having bored therein the vertical hole 85 having the plug 86 in its lower end. Communicating with the vertical hole 85 are the horizontal holes 87 having their outer ends communicating with the circumferential groove 88 in the inner surface of the valve stem guide 89 having communication with the horizontal hole 69', as by the hole 90 which leads from the upper groove 88 into the circumferential groove 91, in the outer surface of the valve stem guide, which is in alignment with the horizontal hole 69, having communication with the rotor as by the pipe 68, previously described. The valve stem 17' also has a reduced portion 29' forming a space between the lower end of the guide and the valve stem when the valve head is in contact with its seat. The valve stem is adapted to close the space, between the lower end of the guide and the stem, when the valve head is removed from contact with its seat during the intake, compression and explosion strokes of the cylinder.

As stated, the vertical hole 85 extends toward the head end of the valve. Below the horizontal passageways 87, this vertical passageway 85 opens to the valve bore in the guide 26 by way of horizontal passageways 87'. These passageways open into an annular chamber or enlargement 88' of the valve guide bore. This annular chamber is close to the lower end of the guide and registers with the reduced portion 29' of the valve stem when the valve is closed, permitting flow of air to the back of the valve as shown.

An important advantage of the invention is that the outlet openings 59', from the casing 44, are positioned 180° from the entrance of the inlet opening 47, whereby the currents of air are adapted to be forced through the outlet openings 59' with minimum loss of air compression. Also, the passage 64, having communication with the inner compartment of the casing 44, as by the holes 64', permits the rotor to be operated without loss of power which may result from a vacuum being formed between the outer edges 56 of the blades or plates 55 after the blades pass the outlet openings 59' and before the same normally pass the inlet opening 47.

Still another important advantage of the invention is that the horizontal hole 69 may be economically formed in the engine head 3 whereby the cost of installing or incorporating the invention with the ordinary internal combustion engine is relatively small.

An advantage of the invention, from the standpoint of increasing the normal power capable of being developed by the internal combustion engine, is that the exhaust and inlet openings which communicate with the cylinder may have a large area, with relation to the size of the cylinder 4. Moreover, since the valve head 30, the valve guide 26 and the stem 17 are maintained at a low temperature, the size and weight of these parts may be reduced with a result that the engine will operate with minimum vibration. Also, cheaper material may be used to form the valve stem and valve head, since the parts are not subjected to high temperatures and excessive strains.

Still another advantage of the invention is that currents of air intermittently cool the valve head and stem and lubricate the valve stem. Also, the piston walls and the top and walls of the cylinder, and the oil in the crank case, are maintained at a low temperature. Therefore, the exhaust valve seat is unlikely to burn, or pit, and the valve head will not warp.

Another important point is that carbon deposits on the exhaust valve guide are practically eliminated by constant currents of air. Moreover, sticking of the valve is eliminated, thereby preventing backfiring of the engine.

Still another advantage of the invention is that the exhaust valve may be adjusted so that it will remain open near or at the bottom dead center of the piston stroke, whereby the engine will develop greater power with relation to the consumption of fuel. Also, the clearance through which the valves are required to travel during their operation is relatively small, whereby the engine is adapted to operate smoothly without excessive vibration.

It is, therefore, apparent that I have invented a useful structure, which embodies the features of advantages enumerated. While I have, in the present instance, shown and described preferred embodiments of the invention, or modifications thereof, various changes may be made in the general form and arrangement of the preferred parts described without departing from the invention. For this reason I do not limit myself to the details of the parts, or materials, or the size and shape thereof, as set forth, but desire to state that I feel at liberty to make such changes and alterations, as fairly fall within the spirit and scope of the appended and final claims.

What I claim as new and desire to secure by Letters Patent is:

1. In an internal combustion engine, a body including a cylinder block and a cylinder head thereon, pistons in the cylinders of said block, an exhaust valve for each cylinder, said body including a guide element for each exhaust valve including a vertically disposed valve guide bore, said body including an air supply passageway disposed longitudinally thereof, the axis of said passageway intersecting the axes of said guide elements, said body including an exhaust passageway for each cylinder having an exhaust valve seat formed therein, each exhaust valve guide bore including an enlargement adjacent its lower end, means connecting said enlargement with the longitudinally disposed passageway, each exhaust valve including a counterturned reduced diameter portion at the lower end of its stem adapted to register with said enlargement in the valve guide bore when the valve is closed for permitting air flow to the back of the valve head, and said counterturned position arranged so as to be disposed beyond the enlargement when the valve is open, whereby that portion of the valve stem which is not counterturned closes the chamber formed by the enlargement.

2. In an internal combustion engine, a body including a cylinder block and a cylinder head thereon, pistons in the cylinders of said block, an exhaust valve for each cylinder, said body including a guide element for each exhaust valve including a vertically disposed valve guide bore, said body including an air supply passageway disposed longitudinally thereof, the axis of said passageway intersecting the axes of said guide elements, said body including an exhaust passageway for each cylinder having an exhaust valve seat formed therein, connecting passageways extending from the longitudinal passageway to the respective valve guide bores, each exhaust valve including a counterturned reduced diameter portion on the stem thereof at its lower end, means connecting the space defined by said counterturned reduced diameter portion and the valve guide bore with said connecting passageways when the valve is closed for permitting air flow to the back of the valve head, and that portion of the stem which is not counterturned being arranged so as to block the flow when the valve is open.

3. In an internal combustion engine, a body including a cylinder block and a cylinder head thereon, pistons in the cylinders of said block, said head including an inlet valve bore and an exhaust valve bore for each cylinder, said body including a bore formed longitudinally thereof, the axis of said bore intersecting the axes of said valve bores, said body including an inlet and exhaust passageway for each cylinder, each having a seat formed therein, a valve guide in each bore, exhaust and inlet valve slidably mounted in respective guides, each valve guide including an annular groove connected with the longitudinally disposed bore, each exhaust valve guide including passageways extended from the annular grooves to and axially of the valve guide bore, air compression means supplying air to the valve guide bores through said longitudinally extending bore, grooves and passageways, said exhaust valve stems including cut-away portions permitting air flow to the back of the valve head, and said portions arranged so as to be disposed beyond the passageways to and axially of the valve guide bore when the valve is open, whereby that portion of the valve stem which is not cut away closes the passageways.

VICTOR F. ZAHODIAKIN.